July 27, 1926.
M. G. McNEELY
1,594,103
UNIVERSAL WHEEL DRIVE
Filed April 28, 1924
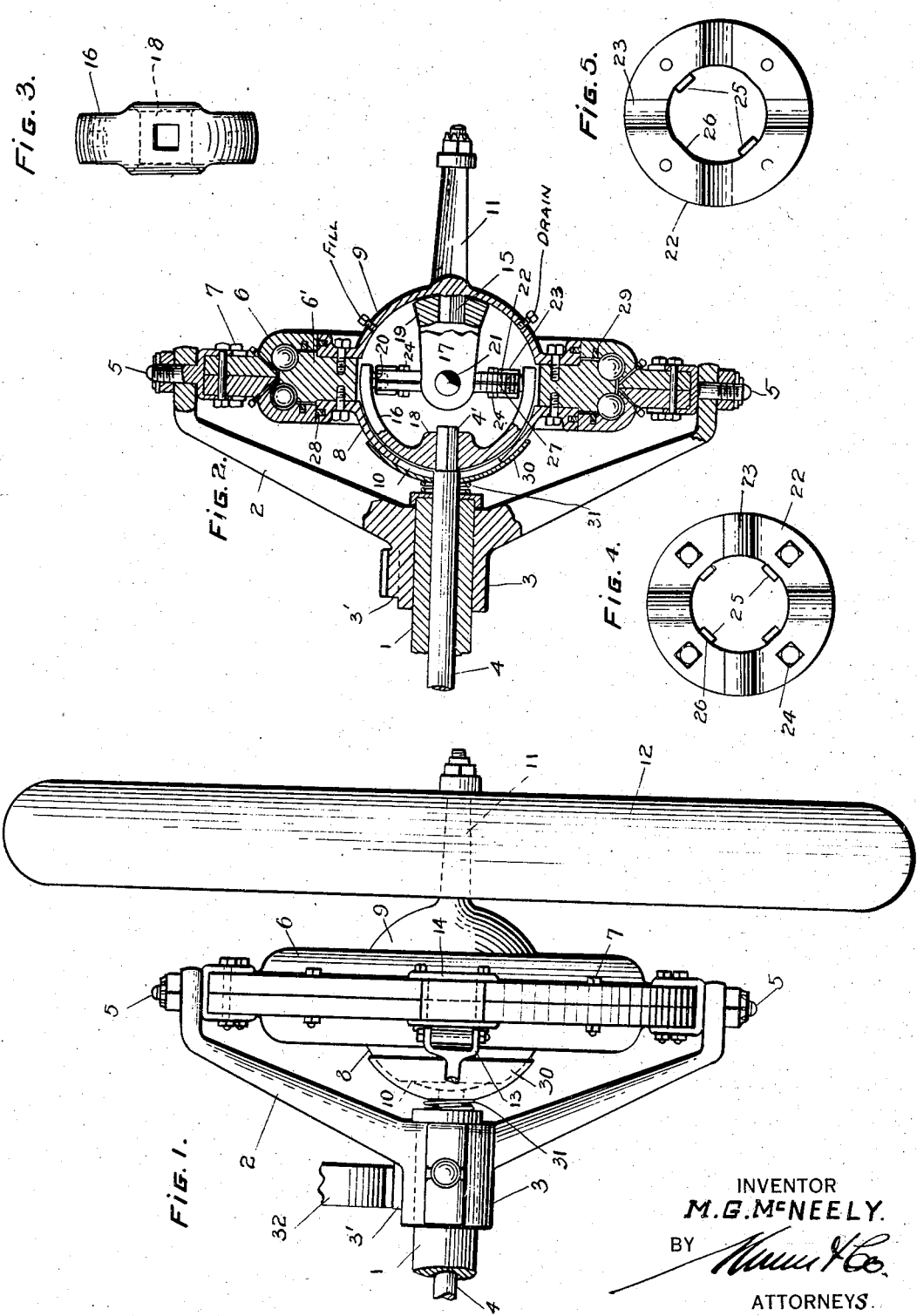
INVENTOR
M.G.McNEELY.
BY
ATTORNEYS.

Patented July 27, 1926.

1,594,103

UNITED STATES PATENT OFFICE.

MARION G. McNEELY, OF OAKLAND, CALIFORNIA.

UNIVERSAL WHEEL DRIVE.

Application filed April 28, 1924. Serial No. 709,586.

This invention relates to universal drives in general but in particular to such drives when applied to the front wheels of automobiles.

The particular objects of my invention are to provide a drive of this kind which will have very little influence on the steering of the wheels, be compact, dust proof, simple in assembly, rugged in use, efficient and free from noise.

In general outward appearance the drive is similar to the one shown in my former patent on a front drive for motor vehicles, No. 1,450,099, but varies considerably in internal arrangement of its parts and whereby the improvements mentioned are effected.

In the drawings accompanying this specification, Figure 1 shows in elevation my universal wheel drive applied to the front wheel of an automobile and secured to the axle housing and road springs.

Figure 2 is an enlarged central section of the drive mechanism in position shown in Figure 1.

Figure 3 is an end view of one of the universal jaws to show its spherical segment form.

Figure 4 is a plan view of the split gimbal and Figure 5 shows one half of the split gimbal.

By a more detailed consideration of the drawings it will be seen that the axle housing (1) supports a yoke (2) which has a hub (3) secured to the housing. On the hub (3) of the yoke is a spring anchor plate (3') to which the vehicle road springs (32) are secured to support the frame of the vehicle.

The housing (1) forms one of the axle extension coverings from a common differential housing not shown, and from the differential within the axle housing extends a driving axle (4). Secured to the yoke (2) by trunnion pivots (5) at diametrically opposite vertical points is a large ring shaped double thrust and radial ball bearing (6). This bearing is made of three parts plus the balls, as shown in Figure 2, and the two outer parts are bolted together with the bolts (7).

To opposite sides of the inner part (6') of the bearing are bolted a pair of flanged hemispherical shells (8) and (9) forming a spherical enclosure between them. The inner shell (8) has a large central aperture (10) and the outer shell (9) has a spindle (11) projecting centrally therefrom and non-rotatably supporting the front wheel (12) of the automobile.

The two shells being bolted to the inner ball bearing member revolve with it when the wheel revolves, the yoke meanwhile holding the outer members on the vertical trunnions (5) to permit steering the wheel by means of the forked steering rod (13) pivoted to the bearing by a clip (14) secured thereto.

The driving axle (4) is rotatably mounted within the housing (1) and has a square or other angular or splined extension (4') projecting within the spherical enclosure, and the outer shell (9) has a similar square driving stub (15) integrally formed thereon and also projecting within the enclosure.

Connecting the squared axle (4') and stub (15) is a universal joint especially formed to fit within the spherical enclosure. This joint comprises trunnion jaws or arms (16) and (17) each being outwardly formed to the spherical curvature of the enclosure and having internal hubs (18) and (19) with a square driving hole, one hub (18) engaging the axle end (4') and the other the stub (15) at right angles to each other as shown in Figure 2.

These hubs fit smoothly over their respective shaft ends so that they are free to slightly adjust themselves to prevent binding of the joint.

At the outer ends of the arms (16) and (17) are inwardly projecting trunnion pins (20) and (21) and overlapping the four pins is a split gimbal ring (22). This ring (22) is shown clearly in Figures 4 and 5 and comprises two duplicate halves with enlargements (23) forming bearings for each trunnion. The halves are divided along a line passing through the center of the pins (as shown in Figure 2) and secured together by four bolts or screws (24).

Figure 5 shows one of the halves only, and at (25) will be seen two lugs formed integral with the side. These lugs are adapted to project over the edge of the other half when the halves are placed together and seat themselves against finished flat spots (26) on the opposite ring half, thus firmly locking them against displacement or possibility of binding the trunnion bearings should the bolts not be a tight fit.

In practice the ring halves will be assembled over the pins with suitable shims (27) between them so that they may be adjusted for wear of the bearings.

The drive runs in grease and the shells seal against the inner edges of the stationary parts (6) of the bearings by spring rings (28) while additional rings (29) between the bearing members seal the lubricant in the ball races, and a spherical cup or plate (30) held against the shell (8) by a spring (31) seals the opening (10) yet permits freedom of the drive on the trunnions (5) for steering.

The ease of assembly or removal of the wearing parts of my drive is one of the principal advantages of the invention, and it will be noted that if the outer shell (9) is unbolted from the bearing, all the universal elements may be withdrawn through the forward opening so that the assembly may be placed on a work bench and the split ring (22) may be renewed or tightened over the pins (20) and the complete universal unit easily replaced within the shell, and that when in the shell enclosure the universal element having no outward projections fits nicely within the enclosure so as to be stabilized thereby yet is free enough for slight axial movement on the square driving shafts to insure freedom from binding of its operating parts.

I claim:

In a universal wheel drive of the character described, an annular bearing having shells secured to opposite sides thereof forming an enclosure therebetween, one of said shells being axially removable from the bearing and having a wheel supporting spindle projecting therefrom in the axial line of the bearing and a driving lug projecting within the enclosure, an axial opening in the other shell with a driving shaft projecting within the enclosure and a complete universal joint within the enclosure engaging the driving lug and the shaft and being free for slight axial movement therein, the universal joint being axially removable from the enclosure upon removing one of the shells, said universal joint having opposed jaws with inwardly extending trunnion pins embraced by a split gimbal ring divided on a plane passing through the longitudinal axes of the pins, the halves of said ring each having lugs formed thereon engaging the opposite half of the ring when placed together.

MARION G. McNEELY.